(12) United States Patent
Anwar et al.

(10) Patent No.: US 9,918,110 B2
(45) Date of Patent: Mar. 13, 2018

(54) POINT OF VIEW MULTIMEDIA PLATFORM

(71) Applicant: FieldCast, LLC, Spokane, WA (US)

(72) Inventors: Saeed Z. Anwar, Spokane, WA (US); Tenzing P. Tshering, New York, NY (US)

(73) Assignee: FIELDCAST LLC, Spokane, WA (US)

( * ) Notice: Subject to any disclaimer, the term of this patent is extended or adjusted under 35 U.S.C. 154(b) by 583 days.

(21) Appl. No.: 14/565,915

(22) Filed: Dec. 10, 2014

(65) Prior Publication Data

US 2015/0172605 A1 Jun. 18, 2015

Related U.S. Application Data

(60) Provisional application No. 61/915,783, filed on Dec. 13, 2013, provisional application No. 61/935,982, (Continued)

(51) Int. Cl.
| H04N 21/218 | (2011.01) |
| H04N 21/2187 | (2011.01) |
| H04N 21/234 | (2011.01) |
| H04N 21/2343 | (2011.01) |
| H04N 21/235 | (2011.01) |
| H04N 21/81 | (2011.01) |
| H04N 7/18 | (2006.01) |

(Continued)

(52) U.S. Cl.
CPC ....... *H04N 21/21805* (2013.01); *H04N 7/181* (2013.01); *H04N 21/2187* (2013.01); *H04N 21/2353* (2013.01); *H04N 21/23418* (2013.01); *H04N 21/234309* (2013.01); *H04N 21/4728* (2013.01); *H04N 21/47202* (2013.01); *H04N 21/8146* (2013.01); *H04N 21/6437* (2013.01)

(58) Field of Classification Search
CPC ......... H04N 21/47202; H04N 21/4728; H04N 7/181; H04N 21/21805; H04N 21/8146; H04N 21/23418; H04N 21/234309; H04N 21/2353; H04N 21/2187; H04N 21/6437
See application file for complete search history.

(56) References Cited

U.S. PATENT DOCUMENTS

| 2009/0022172 A1* | 1/2009 | Haberman ....... H04N 21/23424 370/429 |
| 2013/0070047 A1 | 3/2013 | Digiovanni |

(Continued)

*Primary Examiner* — Brian D Nguyen
(74) *Attorney, Agent, or Firm* — Yuri L. Eliezer; Bekiares Eliezer LLP

(57) ABSTRACT

A point of view platform may be comprised of an ingest layer; a processing layer; a rules engine; and a streaming layer. The ingest layer may be configured to: receive audio, video, and telemetric data associated with a plurality of capturing devices. The rules engine may be configured to: determine a plurality of views to be generated from the received data, and derive a set of rules for processing the received data to generate each of the plurality of views. The processing layer may be configured to derive metadata from the received data, apply the set of rules for processing the data, process the received data based on the metadata and the rules, and generate content associated with each of the plurality of views. The streaming layer may be configured to: receive an end-user selection of a particular view and stream the content associated with the particular view.

19 Claims, 9 Drawing Sheets

Related U.S. Application Data filed on Feb. 5, 2014, provisional application No. 62/026,475, filed on Jul. 18, 2014, provisional application No. 62/059,378, filed on Oct. 3, 2014.

(51) Int. Cl.
| | | |
|---|---|---|
| *H04N 21/472* | (2011.01) | |
| *H04N 21/4728* | (2011.01) | |
| *H04N 21/6437* | (2011.01) | |

(56) References Cited

U.S. PATENT DOCUMENTS

| | | | |
|---|---|---|---|
| 2013/0182116 A1 | 7/2013 | Arima | |
| 2013/0286959 A1* | 10/2013 | Lou | H04W 72/04 |
| | | | 370/329 |
| 2013/0303248 A1 | 11/2013 | Williams | |
| 2014/0081428 A1* | 3/2014 | Rudberg | G05B 19/02 |
| | | | 700/66 |
| 2015/0046407 A1* | 2/2015 | Kalas | G06F 17/30082 |
| | | | 707/691 |
| 2015/0066625 A1* | 3/2015 | McDonald | G06Q 30/0239 |
| | | | 705/14.39 |
| 2015/0067754 A1* | 3/2015 | Wiser | H04N 21/2668 |
| | | | 725/120 |
| 2015/0074259 A1* | 3/2015 | Ansari | H04L 67/02 |
| | | | 709/224 |
| 2015/0105159 A1* | 4/2015 | Palotas | G06F 3/011 |
| | | | 463/37 |
| 2015/0149407 A1* | 5/2015 | Abbott | G06F 17/30165 |
| | | | 707/610 |

\* cited by examiner

POINT OF VIEW MULTIMEDIA PLATFORM

RELATED APPLICATIONS

Under provisions of 35 U.S.C. § 119(e), the Applicant claims the benefit of, and incorporates by reference, in their entirety:

a. Provisional Application No. 61/915,783, entitled "Point of View Multimedia Platform,", filed on Dec. 13, 2013 in the name of Saeed Z. Anwar and Tenzing P. Tshering;

b. Provisional Application No. 61/935,982, entitled "Point of View Multimedia Provision,", filed on Feb. 5, 2014 in the name of Saeed Z. Anwar and Tenzing P. Tshering;

c. Provisional Application No. 62/026,475, entitled "Wearable System with Integrated Peripherals,", filed on Jul. 18, 2014 in the name of Saeed Z. Anwar and Tenzing P. Tshering; and d. Provisional Application No. 62/059,378, entitled "Point of View Video Processing and Curation Platform," filed on Oct. 3, 2014 in the name of Saeed Z. Anwar and Tenzing P. Tshering.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to content capture, processing, and delivery in a networked environment.

BACKGROUND

The current state-of-the-art of video and audio capture, processing, and delivery may involve, for example, multiple capturing cameras and microphones throughout a venue. In the typical setup, each venue camera may be associated with a broadcast feed that can be selected for transmission to entities within the venue or entities in remote proximity to the venue.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
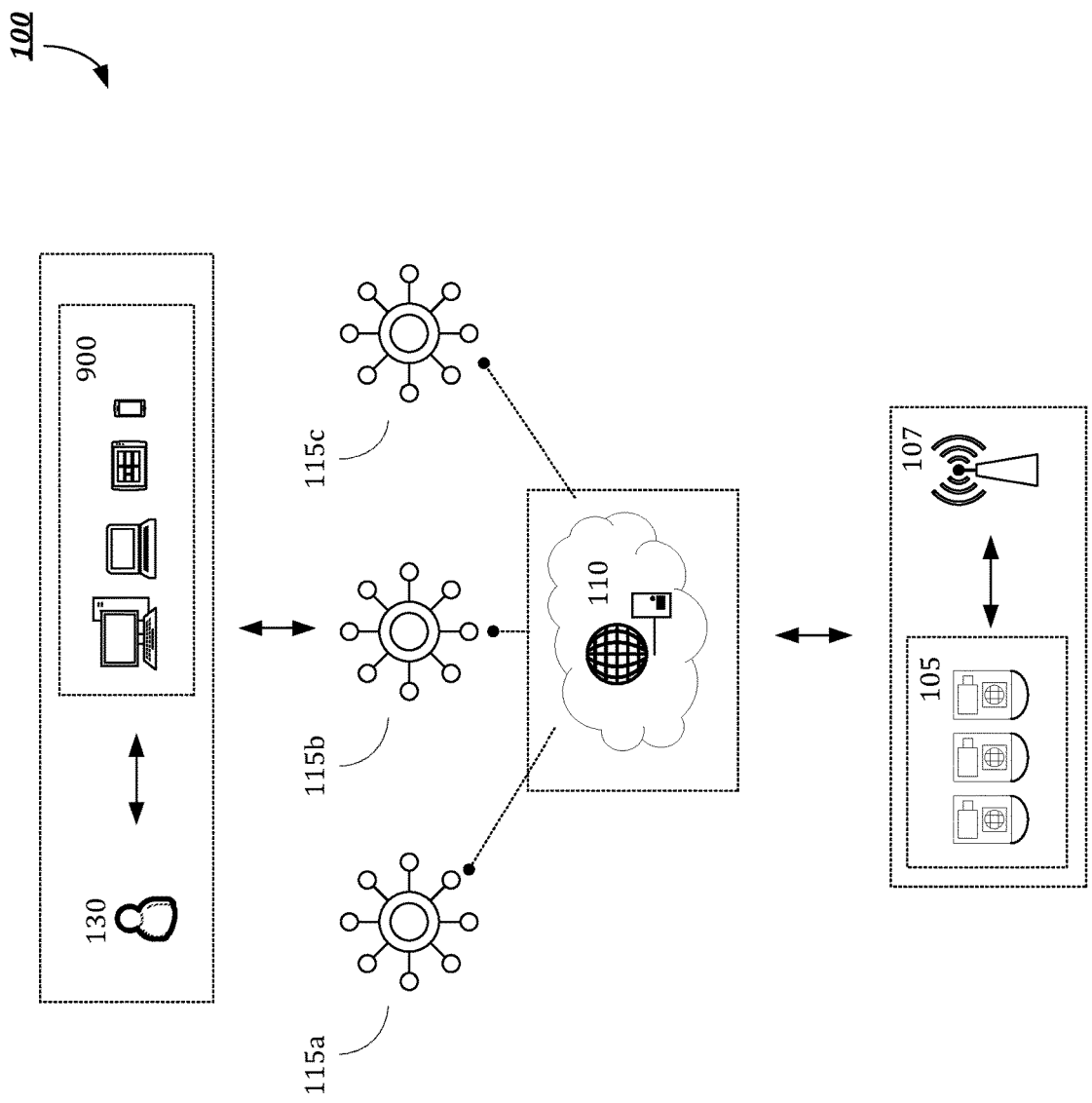
FIG. 1 illustrates an operating environment for providing a Point of View (POV) multimedia platform.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

In conventional systems, the selection of a broadcast feed to stream may be in the manual control of an operator within a venue. In turn, the operator's selection of the broadcast stream may cause the single, selected broadcast feed to be provided to audiences. Conventional systems do not provide audiences with control over the selection of different views that are available in the venue. Rather, the operator remains in control of the broadcast selection process. In turn, conventional systems limit audiences (within the venue and remote to the venue) to viewing content that is exclusively within an operator's control.

I. Platform Overview

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide a Point of View (POV) multimedia platform addressing this problem, as well as other problems found in conventional systems. The platform may enable viewers to select various points of views captured within the venue for streaming. Furthermore, the platform may be operative with remote viewers, enabling venue selection in addition to the accessibility to various points of view captured within a selected venue.

Some embodiments of the present disclosure may be understood by way of the follow non-limiting example: a plurality of football players may be outfitted with a gear (e.g., a helmet) integrated with capturing devices (e.g., capturing audio/video/telemetry data). The gear may be configured for bi-directional communication. For example, the gear may communicate the captured data to a transmission links located within the football stadium. Via the transmission links, the captured data may be transmitted from the football stadium to a data center for processing.

In turn, the data center may process the captured data to create a plurality of views. The processing may employ a plurality of algorithms to provide the plurality of views. For example, processing may include various image filtering and stabilization techniques, content stitching techniques (e.g., combining multiple capturing sources from a single football player, combining the content captured from multiple football players, and other variations and combinations as detailed infra), all of which may be based on rules for processing the content based on metadata gathered from the content. These views may then be presented to end-users of the platform who may select a desired view for streaming and playback. The end users may be, for example, spectators, coaches, managers, or any other party interested in the content.

Consistent with embodiments of the present disclosure, coaches may be provided with a first set of views while audience members may be provided with a second set of views for selection. Upon receiving a selection of a desired view, the processed data associated with the view may be streamed to the user. The platform may employ a content delivery network (CDN) to facilitate streaming between the data center and the end user.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

II. Platform Operating Environment

FIG. 1 illustrates one possible operating environment through which a platform consistent with embodiments of the present disclosure may be provided. By way of non-limiting example, a platform 100 may be hosted on centralized servers, such as, for example, a cloud computing service or data center 110. A user 130 may access platform 100 through a software application. One possible embodiment of the software application may be provided by the Sport of View™ suite of products and services provided by FieldCast LLC.

The software application may be embodied as, for example, but not be limited to, a website, a web application, a desktop application, and a mobile application compatible with a computing device 900. As will be detailed with reference to FIG. 9 below, the computing device through which platform 100 may be accessed by users 130 may comprise, but not be limited to, for example, a desktop computer, laptop, a tablet, or mobile telecommunications device.

Platform 100 may comprise, but not be limited to, for example, the following components:

i) a content capturing component configured to capture content from a plurality of capturing devices (e.g., capturing devices 105);

ii) a content transmission component configured to communicate the captured content (e.g., venue networking devices 107);

iii) a content ingestion component to receive and store the captured content (e.g., data center 110);

iv) a processing component configured to process content so as to generate broadcast streams associated captured content (e.g., data center 110);

v) a content delivery component to provide the captured content to end-users of the platform (e.g., delivery networks 115a-c); and vi) a computer generated imagery (CGI) component for visualizing data associated with the captured content.

a. Content Detection and Capture

Platform 100 may comprise, but not be limited to, for example, system architectures, apparatuses, methods, and processes comprising multiple detection and capturing devices 105. Detection and capturing devices 105 may comprise, but not be limited to, video cameras, microphones, accelerometers, and location detection systems and methods. It should be understood that detection devices and capturing devices may be used interchangeably throughout the present disclosure.

Capturing devices 105 are further detailed in incorporated Provisional Application No. 62/026,475, entitled "Wearable System with Integrated Peripherals,", filed on Jul. 18, 2014 in the name of Saeed Z. Anwar and Tenzing P. Tshering (hereinafter referred to as the '475 disclosure). Accordingly, any reference made herein to a capturing device, detection device, sensing device, or any other means for data collection may, where necessary for enablement (should such detail not be evident to one of ordinary skill in the art after studying the present disclosure), include features and functions of the '475 disclosure.

As will be understood in greater detail infra, detection and capturing devices 105 may be incorporated into, for example, but not limited to, a helmet. For example, in some embodiments, platform 100 may be deployed for athletic events having multiple players (e.g., football games). Thus, in accordance to the various embodiments disclosed herein, each football player may have at least one camera embedded within his helmet. In addition, the player's helmet may further comprise wireless transmission elements, such as, for example, Wi-Fi based communication circuitry.

b. Content Transmission

Still consistent with embodiments of the present disclosure, platform 100 may be enabled to receive and ingest captured content from each players' integrated capturing devices 105. Each player's integrated capturing device 105 (e.g., the aforementioned helmet having a camera and transmission technology integrated therein) may provide captured video and audio streams for processing at, for example, data-center 110.

As will be described in greater detail infra, the integrated capturing devices may be associated with wireless communication circuitry. The communication circuitry, in turn, may be enabled to transmit the captured content to various wireless access points 107 located throughout the venue. In turn, wireless access points 107 may be operative to forward to the received transmissions to, for example, data-center 110 for content ingestion and processing. Such communication may be bi-directional.

Conventional Wi-Fi, Bluetooth, and Internet Protocol (IP) communication techniques may be used in transmitting the captured content. Although the present disclosure makes reference to Wi-Fi, Bluetooth and IP protocols of communication, it is anticipated that any communication protocol suitable for transmitting captured data may be employed by platform 100.

c. Content Ingestion and Processing

Platform 100 may comprise infrastructure to receive and ingest these streams for processing and formatting purposes. Such infrastructure may be located, at least in part, within data center 110. The streamed content, in turn, may provide viewers with various points of view for the venue. A point of view may comprise, for example, a processed content stream or a plurality of processed content streams based on various processing rules.

Content processing may comprise a plurality of processing layers. Each processing layer may be configured to perform a particular processing task. For example, a first layer may be associated with image stabilization, while a second layer may be associated with content stitching (as will be detailed infra). Additional layers may be associated with, but not limited to, image focus, digital overlays, and various other digital signal and imaging processing capabilities.

Embodiments of the present disclosure may be operative with processing rules. Processing rules may be employed by the platform to provide a particularly process content for streaming. Each processing layer may be activated or deactivated based on at least one rule governing the processing of the content, and points of view, as will be detailed below, may be provided accordingly.

Video Processing is further disclosed in incorporated Provisional Application No. 62/059,378, entitled "Point of View Video Processing and Curation Platform,", filed on Dec. 13, 2013 in the name of Saeed Z. Anwar and Tenzing P. Tshering (hereinafter the '378 application). Accordingly, any reference made herein to a content/video/audio/data processing herein may, where necessary for enablement (should such detail not be evident to one of ordinary skill in the art after studying the present disclosure), include features and functions of the '378 disclosure.

d. Content Delivery

Platform 100 may be configured to distribute the processed content through multiple channels. Accordingly, in yet further embodiments of the present disclosure, the platform may facilitate the distribution of formatted content over broadcast TV and CDNs (e.g., networks 115a-115c). For example, in various embodiments of the present disclosure, the content generated through the platform's capture and processing of content may result in, for example, video streams that can be distributed to consumers through existing distribution channels, such as, but not limited to, for example: Broadcast, Replay TV, NFL RedZone, Twitter Clips, Stadium Jumbotrons, In-Stadium Fan Entertainment, and News Channels.

Furthermore, platform 100 may provide, or, in some embodiments, may be associated with, new distribution channels for the processed content. For example, the processed content may be provided through, but not limited to, for example, interactive computing applications compatible with streaming video, including, but not limited to Web Apps, Desktop Apps, Mobile Device (iOS, Android, Windows) Apps, and the like.

These applications may connect to platform 100 and enable an end-user 130 to select, for example, a broadcast feed to stream through the application. The broadcast feed streams may be made available to the application through an operating entity associated with platform 100. In some embodiments, the application may comprise a user interface (provided via computing device 900) for selecting the broadcast stream and a multimedia playback component for playing the selected broadcast stream. User 105 of the application may further be enabled to select a point of view. As mentioned above, point of view may be a processed video stream or a plurality of processed video streams based on various processing rules.

Referring back to the context of the football game implementation of platform 100, by means of an application associated with the third component, user 130 of platform 100 may select, for example, a desired point of view. Still consistent with embodiments of the present disclosure, user 130 of platform 100 may opt to select which player's helmet camera (e.g., detection and capturing device 105) to view. In turn, by selecting a direct camera view rather than a processed "point of view," the user of the platform may be provided, for example, a raw feed with minimal processing. In this way, embodiments of the present disclosure enable users 130 to control the content provided to them, thereby providing a more on-demand, interactive experience with the venue and the event therein.

A content operator may be enabled to operate the platform either from data center 110 or remotely at a venue from which content is being captured. The operator may access a control panel comprising a user-interface having a plurality of controls for operating the detection, transmission, processing, and provision components of the platform. Similarly, users 130 may access platform (e.g., via the software application as detailed in FIG. 9) to select various views associated with content and receive the transmission of the selected views from platform 100. The platform elements may be employed to ingest, reformat, and deliver content captured by the cameras and microphones. In turn, the content may be used in, for example, commercial business channels including broadcast television (TV) and content distribution networks (CDN).

e. Computer Generated Imagery

Consistent with embodiments of the present disclosure, platform 100 may be operative to process the data captured from the various detection devices and render various computer generated imagery (CGI). As will be detailed infra, the CGI may simulate the content captured by the detection and capturing devices 105 in an interactive computing environment that gives a user of the platform control over the representations of the captured content. For example, using CGI based on the captured content, platform 100 may provide an interface that represents the field, the players, and the plays executed by the players, with various controls as to the point of views, play-back, and statistics associated therewith.

III. Platform Architecture

Figure 2:
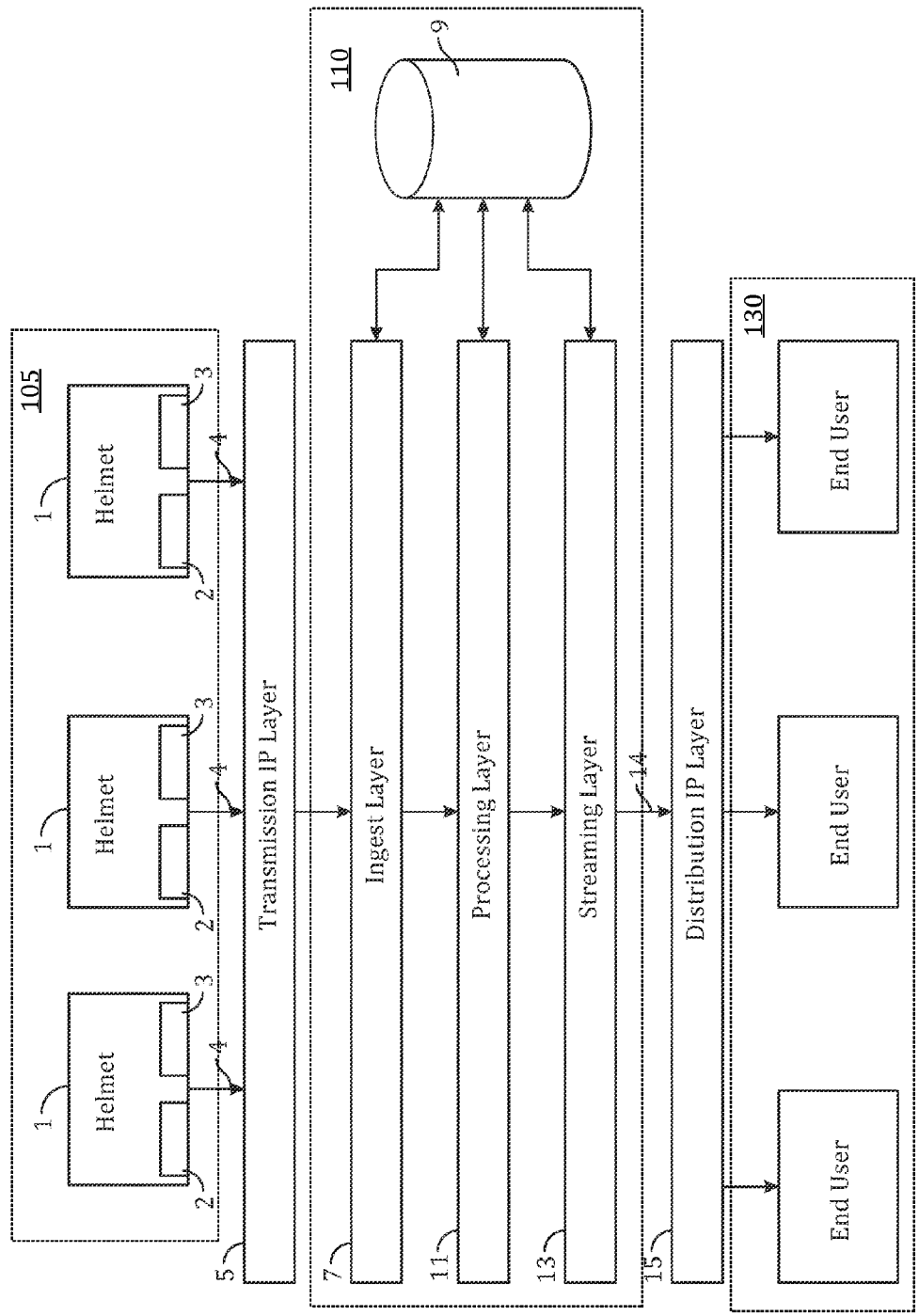
FIG. 2 illustrates an embodiment of an architecture for providing the POV platform.

FIG. 2 is a block diagram of an architecture for providing platform 100 in accordance to one possible embodiment of the present disclosure. The block diagram illustrates an end-to-end delivery of multiple detection devices (e.g., capturing device 105), represented by labels 2 and 3, to multiple end-user destinations (e.g., users 130), represented by label 17.

a. Content Detection and Capture

Capturing devices 105 may comprise video and audio sources, such as, for example, video cameras and microphones (e.g., elements 2 and 3 of FIG. 2). Still consistent with embodiments of the present disclosure, capturing devices 105 may further comprise orientation and acceleration sensing devices, such as, for example, compasses and accelerometers. In yet further embodiments, capturing devices 105 may detect a position associated with the detection device. In these embodiments, capturing devices 105 may further comprise components for performing location triangulation methods as well as, for example, global positioning systems, Radio Frequency Identifier (RFID), and Timing and Inertial measurement Unit (TIMU) components.

In various embodiments, capturing devices 105 may be integrated into a portion of a player's equipment such as, for example, but not limited to, a player's head-gear, represented by label 1. (See the '475 disclosure.) Still consistent with embodiments of the present disclosure, capturing devices 105 may be attached to any suitable portion of a player's equipment. For example, gyroscopic movement detection devices may be attached to a player's appendices. The data captured by the gyroscopic movement detection device may be translated into, for example, a virtual simulation of the player. When combined with the other detection devices associated with the player's equipment, a substantial virtual reality simulation may be provided to user 130 (as will be detailed in the CGI portion of the present disclosure).

Consistent with embodiments of the present disclosure, each player in, for example, a football game may be associated with at least one detection device 105. Then, the various audio and video sources associated with the players may be combined, in a processing layer 11 to provide numerous points of view of the sporting event. The points of view, in turn, may be provided to an end-user of the platform for selection.

b. Content Transmission

Still consistent with embodiments of the present disclosure, the platform may be enabled to receive and ingest captured content from each players' integrated capturing devices 105. Each player's integrated capturing device 105 (e.g., the aforementioned helmet having a camera and transmission technology integrated therein) may provide, through the communication circuitry, captured video and audio streams for processing.

As will be detailed with reference to FIG. 3, the communication circuitry may comprise electromagnetic transmission and reception components. The transmission components may be used to communicate the captured video and audio signals to external entities, whereas the reception components may be used to enable an operator to monitor and control capturing devices 105 integrated into the helmet.

Figure 4:
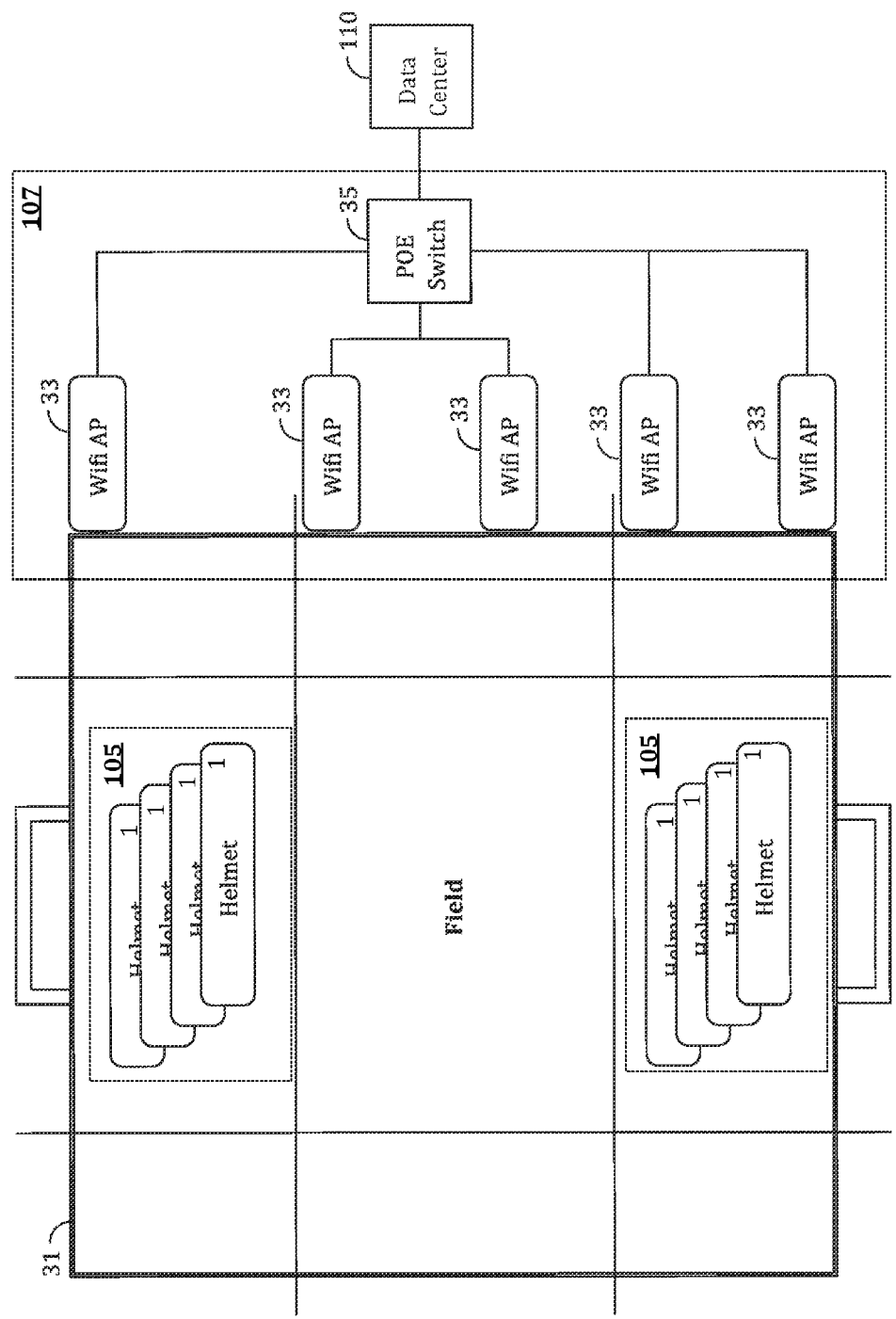
FIG. 4 illustrates an embodiment of an IP layer integration within a venue.

As will be detailed in FIG. 4, wireless access points 107 may be located throughout the venue. The communication circuitry integrated into the players' helmets may be operative to connect to a nearest access point to maintain a line of communication with high integrity and connectivity. In turn, these wireless access points 107 may be operative to forward to the received transmissions to, for example, a data-center for content ingestion and processing.

Although the present disclosure references wireless access points 107, conventional Wi-Fi, Bluetooth, and Internet Protocol (IP) communication techniques may be used in transmitting the captured content. Furthermore, it is anticipated that any communication protocol suitable for transmitting captured data may be employed by the platform.

c. Content Ingestion

All data captured by detection devices may be transported over an Internet Protocol (IP) layer 5 to an ingest layer 7. In various other embodiments, the data captured by detection devices could be transported to the IP layer through an interim Wi-Fi or Bluetooth bridge layer 4. Wi-Fi and Bluetooth infrastructure for the communication of captured data to ingest layer 7 may be installed at various points throughout the venue hosting the event.

In ingest layer 7, the captured data may be stored in a storage device 9. Storage device 9 may be scalable using RAID or SAN methods known to those of ordinary skill in the field of information technology systems. In some embodiments, storage device 9 may reside in a cloud-computing environment. Accordingly, the connection to the storage device may be over, for example, a standard IP connection.

Having received and stored the captured data, ingest layer 7 may parse and label the captured data. For example, ingest layer 7 may embed metadata within the data, indicating various properties of the data, such as, but not limited to, for example, capturing device location, inertia, and a time associated with the captured data.

d. Content Processing

The ingested data may then be provided to a processing layer 11. Although portions of the present disclosure describe video and audio processing, processing layer 11 may be capable of processing any captured data form any type of detection device. In this way, real-time data associated with all available detection devices may be provided to and processed by processing Layer 11.

In accordance to embodiments of the present disclosure, processing layer 11 may comprise data and image processing sub-layers, such as, but not limited to, for example, software based image stabilization, digital signage, image focus, content overlay, and various other digital signal and image processing functions. Processing layer 11 may process the captured data to provide various points of view to the content delivery layer of platform 100 which, in turn, provides the various points of view for user selection and streaming.

A point of view may comprise, for example, a processed video stream or a plurality of processed video streams based on various processing rules. Content processing may comprise a plurality of processing sub-layers. Each processing sub-layer may be configured to perform a particular processing task. For example, a first sub-layer may be associated with image stabilization, while a second sub-layer may be associated with content stitching (as will be detailed below). Additional sub-layers may be associated with, but not limited to, image focus, digital overlays, and various other digital signal and imaging processing capabilities.

Platform 100 may be compatible with plug-in modules that provided extended layer processing functionality. For example, an operator of platform 100 may be able to independently install additional processing functions through third-party developers. In this way, platform 100 may be constantly updated with new processing functionalities. Embodiments of the present disclosure may be operative with processing rules.

Processing rules may be employed by the platform to provide a particularly process content for streaming. Each processing sub-layer may be activated or deactivated based on at least one rule governing the processing of the content.

By way of non-limiting example, one rule may be, for example, a "Follow the Ball" rule. This rule may cause the appropriate content to be ingested and processed based on a tracking of the ball's location and a determination of which players (and corresponding content capturing devices 105) are in proximity to the ball's location. The ball's location may be detected by, for example, imaging processing techniques or a small detection devices implants on the ball. In turn, platform 100 may be operative to process the content so as to sequence the streaming of video feeds associated with capturing devices 105 as they come into proximity to the ball's location. (See the '378 disclosure.)

An operator of platform may create 100 and configure points of view for transmission to users 103. The configuration of the point of view may entail a configuration of the associated processing rules and sub-layers for processing the ingested content to provide the point of view.

In yet further embodiments of the present disclosure, processing layer 11 may be configured to stitch a plurality of video feeds. A stitched video feed may comprise a video feed that is combined from the video feeds provided by a plurality of capturing devices 105. In this way, a user of the platform may be provided with, for example, a hemispheric view of the event from the perspective of multiple capturing devices. For example, during a football game, the platform may provide a user with the hemispheric view of a football field by combining the video feed generated by multiple cameras integrated into a football player's helmet cameras.

As the lens, angles and distance of separation between the cameras on the helmet may be known, the captured images may be subsequently stitched together to produce the hemispheric view. In some embodiments, the captured images may be stitched together using image processing techniques irrespective to the lens, angles, and camera separation. In turn, the stitched hemispheric view may be provided through the platform. User 130 may simulate a rotation of the camera by navigating to different parts of the hemispheric view.

Still consistent with some embodiments of the present disclosure, a helmet camera may be configured with a mechanical rotation means. The mechanical rotation means may be in remote operation by the platform, which may include, but not be limited to, an operator or a user of the platform. As will be further detailed below, a user may be provided access to control the mechanical rotation means through, for example, through an application of the platform.

The points of view may provide a video feed and an audio feed associated with a player's capturing devices 105. In some embodiments, the audio feed may be from a universal audio source while the video feed may correspond to a selected player's video source. In other embodiments, the video feed may be from a universal video source while the audio feed may correspond to a selected player's audio source. In various embodiments, capturing devices 105 may be mixed, stitched and matched with detection devices and over various periods of time to produce various points of view for user selection.

As mentioned supra, platform 100 may also provide stitched content. Accordingly, processing layer 11 may be further configured to create aggregated, panoramic and 3D point of views based on the captured data. In this way, when a platform operator instructs the platform to aggregate multiple video sources from multiple players, then processing layer 11 may create and process a new point of view based on a set of processing (or "business") rules.

The business rules may be provided by an operator of platform 100 through, for example, a web server interface for entering business rules. In this way, the business rules may be dynamically provided and enabled on-demand. The business rules may comprise, for example, instructions for enabling or disabling particular sub-processing layers and corresponding video and audio streams generated by processing layer 11.

For instance, if the all capturing devices 105 for the quarter back are streamed out from the streaming servers, then these rules may be set via Processing layer 11 to provide a point of view associated with the quarter back. In this way, content is ingested and transmitted to processing layer 11, which processes the ingested content based on rules.

In this way, business rules may be enable the processing of video and audio streams by, for example, providing image quality control (e.g., stabilization and focus), image stitching (e.g., combining a plurality of feeds), and image sequencing (e.g., a "Follow the Ball" point of view).

e. Content Delivery

Video and audio streaming of specific views may be performed by the data streaming servers, as streaming layer 13. The streaming content may be provided to the Data Streaming Servers via processing layer 11. A standard IP communication protocol 14 may be used to stream the content. The streaming may occur via a unicast or multicast broadcast transmission.

For example, in various embodiments, processing layer 11 may multicast all streams. If a stream is for broadcast, processing layer 11 may have one multicast address to the broadcast organization. However within the same multicast address, the storage servers will receive a stream to record and that way, yes, we will be able to retransmit.

Similarly, for CDN multicast, the storage devices will be within the same multicast address. Although the storage devices are being used for the ingestion, processing, and delivery layers, there may be no penalty on the performance. For instance, the multicast may be handled with a switch-router. So, although processing layer 11 may select the multicast address for streaming, the switch-router may, in some instances, already be configured with the storage devices on the same multicast to receive the stream. The video and audio streaming servers may connect to the storage drive over a standard IP connection for specific views to stream based on the direction of the video and audio processing layer.

End users 130 may be presented with, for example, a plurality of point of views for selection via the end-user application. As mentioned above, each point of view may correspond to, for example, a player or a combination of players as generated by processing layer 11. Upon selection of a point of view, the application may trigger a transmission of content and/or processed content associated with the point of view. In turn, end users 130 may receive, for example, the corresponding audio and video streams associated with the content. The intranet or internet layers 15 may serve as the transmission medium for the content streaming. Still consistent with embodiments of the present disclosure, and as will be detailed below, the content may be available not only to end users 130 of platform 100, but to various broadcasting entities.

As mentioned above, the platform consistent with embodiments of the present disclosure may provide an application that enables the user to select hemispheric views associated with particular players. In turn, the end-user application providing the streaming point of view content to the user may enable the user to simulate a rotation of a camera. In this way, the user may be able to navigate a view in, for example, a 360 degree environment surrounding a particular player, thereby providing a simulated sense of interactivity within the venue. In some embodiments, the platform may auto-simulate rotation within the hemispheric view. This may be employed, for example, "Follow the Ball" points of view, wherein the hemispheric view may be centered in the directional cardinality associated with the ball.

In various embodiments, the end-user application may be operative with various input devices. For example, a user may wear a device comprising a plurality of detection devices. In some embodiments, the detection device may comprise, for example, virtual reality glasses. The virtual reality glasses may detect a motion and orientation of the user's head. The turning, rotation, or movement of the user's head may cause a corresponding simulation of a rotation within the 360 degree hemispheric view. In other embodiments, the user may control the camera orientation with, for example, a keyboard, mouse, touch screen, and/or various hand gestures.

IV. Platform Integration

Figure 3:
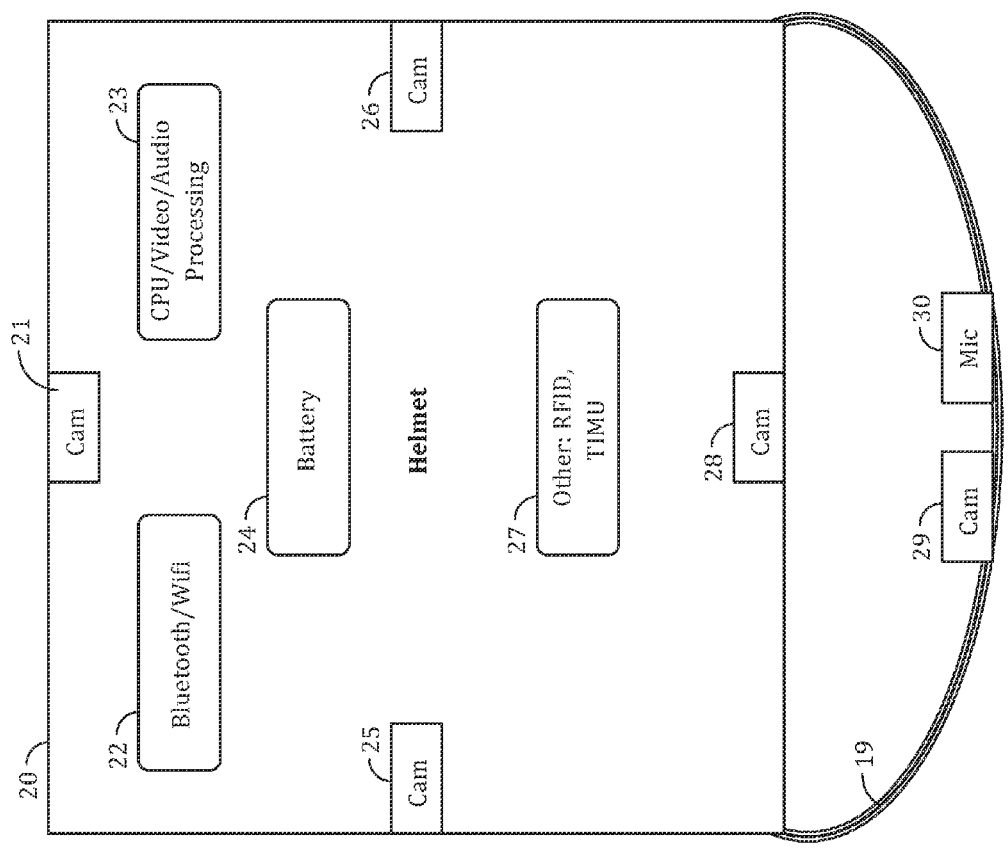
FIG. 3 illustrates an embodiment of content capturing component of the POV platform.

FIG. 3 illustrates a helmet with an embodiment of the content capturing component of platform 100. Capturing Devices 105 may be integrated into the helmet. (See the '475 application.) The helmet may comprise, at least, for example, content capture, processing, and communications components. Each helmet may comprise multiple video cameras, 21, 25, 26, 28 and 29. In addition, each helmet may further comprise at least one audio microphone 30.

Consistent with embodiments of the present disclosure, content captured from a rear-side camera 21, a right-side camera 25, a left-side camera 26, and a front-side camera 28 may be combined, by processing layer 11 to provide a 360 degree view with the personal point of view of each player serving as the vertex. In yet further embodiments, the point of view may be augmented with the face camera 29. The face camera may be pointed towards the player's face to show the facial expressions of the player. In some embodiments, the face camera and microphone may be embedded within the face guard 19.

Capture devices 105, such as, for example, the cameras and the microphone, may be connected to an embedded processing component 23. Processing component 23 may act as a central processing unit for operating the various capturing devices 105 associated with the integrated helmet. This processing component may connect to a communications component 22 enabled with either Bluetooth or Wi-Fi. A battery 24 may server to power the capture, processing, and communication components of the helmet.

In some embodiments, a Bluetooth to Wi-Fi bridge may be a unit that is located in proximity to the body of a player, and may be co-located with an external battery compared to the internal helmet battery. In addition, the helmet may comprise RFID and TIMU components 27, such as, for example, as developed DARPA. These components may be used for location information of players in the bench area and enhancement to the point of view information of players on the field.

FIG. 4 illustrates an embodiment of an IP layer integration within a venue 31. The venue may be, for example, but not limited to, a football stadium. The venue may comprise a plurality of capturing devices 105 (e.g., video, audio, and/or data sources) throughout venue 31.

These detection devices may connect to IP layer 5 through, for example, Wi-Fi Access Points (AP) 33. The Wi-Fi access points may be powered and networked over a CAT5/6 cable. The CAT5/6 cable may be connected to a power source over an Ethernet switch 35. The switch may use, for example, fiber connectivity to establish a connection with a data center 110.

Data center 110 may comprise ingest layer 7 and processing layer 11. In some embodiments, data center 110 may reside within venue 31, while in other embodiments data center 110 may be located at a remote site. Consistent with embodiments of the disclosure, IP layer 105 may also provide location information of players based on Wi-Fi and RFID location methods available to those of ordinary skill in the field of electromagnetic circuitry.

V. Ingest Layer

Figure 5:
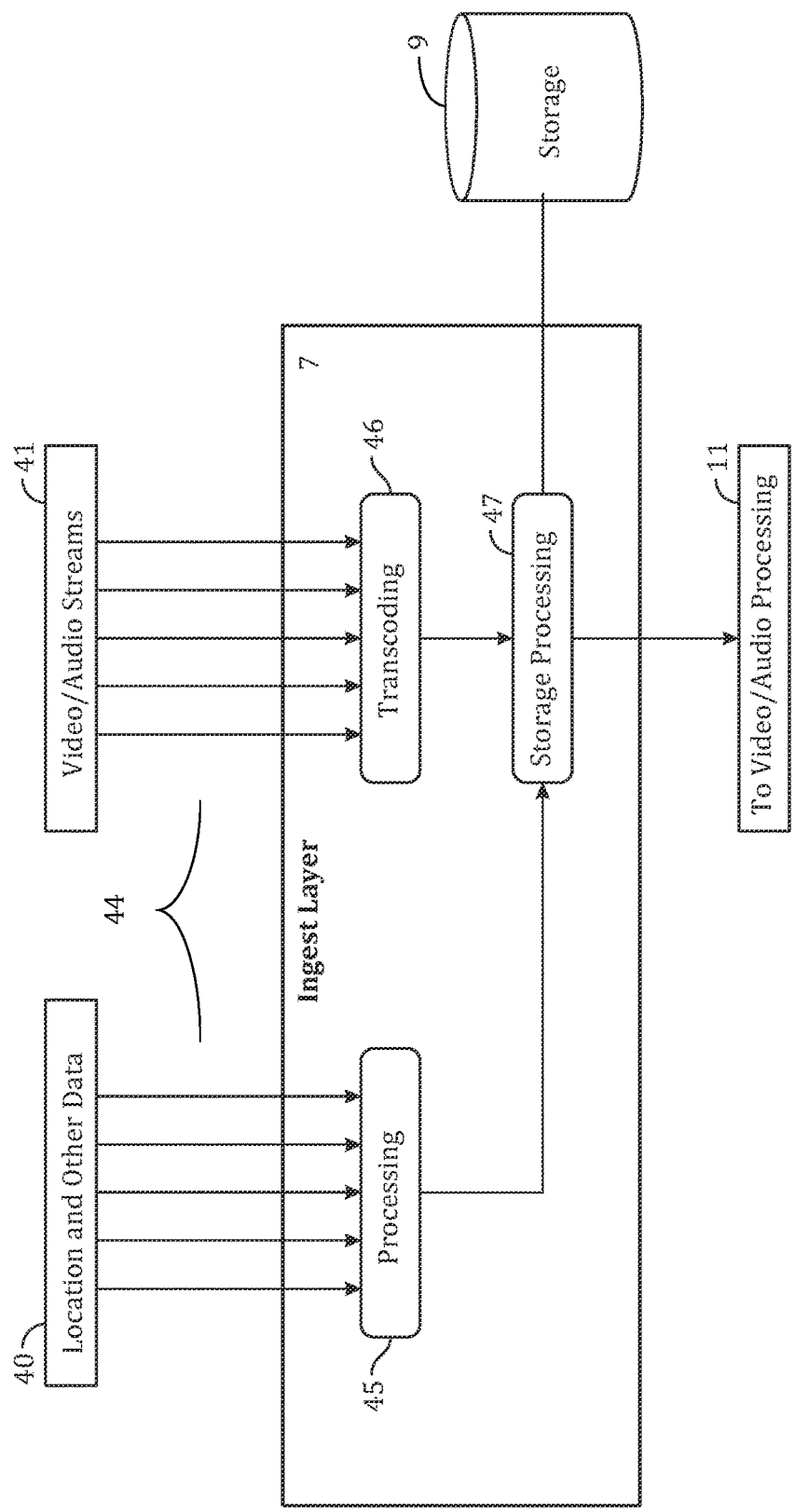
FIG. 5 illustrates an embodiment of an Ingest layer of the POV platform.

FIG. 5 illustrates an embodiment of ingest layer 7 of platform 100. Ingest layer 7 may receive multiple IP streams 44 from detection devices located throughout venue 31 (e.g., the field of play). For example, the video and audio streams 41 originating from the helmets on the field of play may be received within the ingest layer 7 via IP layer 5.

Ingest layer 7 may first transcode the received streams at transcoding component 46, to a format for suitable for storage. The transcoded streams may then be transferred to a storage-processing component 47, using standard computing methods available to one of ordinary skill in the art. The storage-processing component 47 may interact storage device 9 via SAN or RAID, using a standard IP method.

In some embodiments, ingest layer 7 may comprise another input associated with location and other related data 40 coming from the venue. For example, the location data may be triangulated Wi-Fi information, GPS location information, and/or RFID information associated with capturing devices 105 and integrated venue 31.

Consistent with embodiments of the present disclosure, ingest layer 7 may further comprise, inertia data, including, but not limited to, for example, predicted direction and detected motion data (e.g., location and other data 40) associated with the players. In various embodiments, the location data may be combined with the inertia data (as well as any other data associated with the audio and video sources) and then transmitted to storage-processing component 47. In this way, storage processing component 47 may associated the location and inertia data as metadata within an information layer associated with the stored video and audio content. Ingest layer 7 may receive such data as transmission streams and communicate the processed data as data streams to processing layer 11. Although the term "stream" is used throughout the disclosure, in certain embodiments, it may comprise the standard communication of data from one hardware/software component to another.

Still consistent with embodiments of the present disclosure, ingest layer 7 may notify processing layer 11 of which players are on the field of play and which players are in the bench area. The basis for the notification may be provided upon an analysis of the metadata (e.g., the location and inertia data) in storage-processing component 47. In some embodiments, such analysis may be performed by storage-processing component 47 during processing layer's 11 processing of a corresponding player's stored data. The information determined by the analysis may be transmitted to processing layer 11 using standard IP communications methods.

VI. Processing Layer

Figure 6:
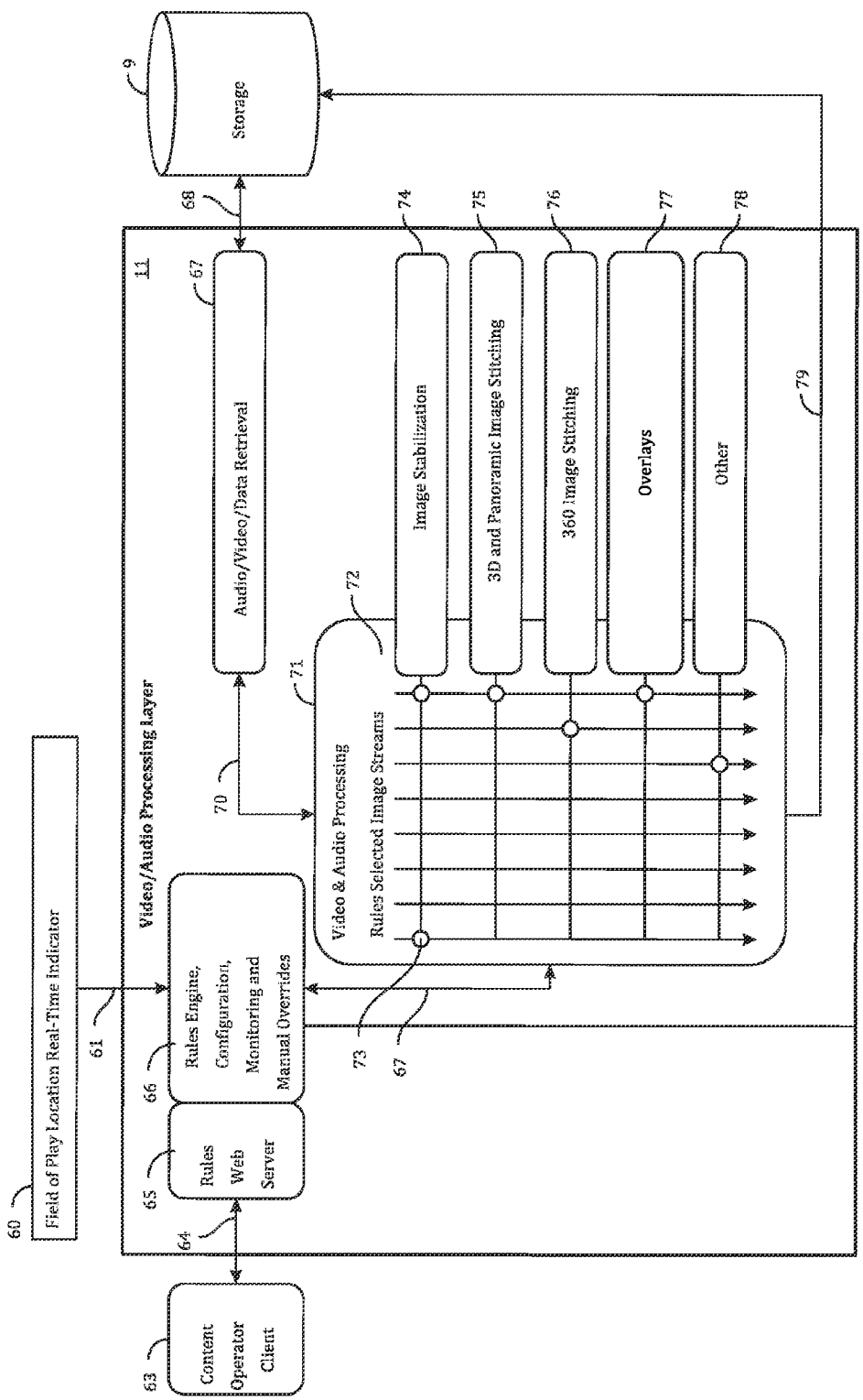
FIG. 6 illustrates an embodiment of a Processing layer of the POV platform.

FIG. 6 illustrates an embodiment of processing layer 11 of platform 100. Processing layer 11 may be configured to process video and audio output data for streaming. Accordingly, ingest layer 7 may place raw audio and video feeds in a storage device, while processing layer 11 may retrieve at least a portion of the feeds for processing and distribution to the video and audio streaming layer. It should be understood that, in various embodiments, the ingest layer's input of the captured content into the storage device may occur in parallel to processing layer 11's processing of the captured content. Thus, as the content is ingested, it may be processed and the processed content may be stored for delivery.

Still consistent with embodiments of the present disclosure, processing layer 11 may be further configured to process non-audio/video data associated with detection devices such as, for example, motion and orientation sensors. Similarly, the non-audio/video data may be stored as raw data in the storage device associated with the ingest layer, while processing layer 11 may retrieve at least a portion of the non-audio/video data for processing and distribution to the Video and Audio streaming layer. In this way, processing layer 11 may be configured to associate the non-audio/video data with the audio/video data during the concatenation of the data for point of view content delivery.

In various embodiments, the retrieval process may be rules based (hereinafter referred to as "business rules"). The business rules may be entered by the content operator through, for example, a web-based client 63. The web-based client may communicate with a web server 65, over, for example, a secure communications link 64. By having web-based client 63 for defining business rules, the platform may allow operators to dynamically add, remove, or otherwise modify business rules. In this way, platform 100 may provide a means to support real-time changes during an event.

In some embodiments, web-based client 63 may be associated with ingest layer 7. In these embodiments, Ingest layer may provide a user interface that enables an operator to input various rules. However, in other embodiments, processing layer 11 may be solely in command of rules configuration, providing the configurations and communications associated with the web-based client interface. As such, the web server may interact with a rules engine 66 and input to the rules is through web server 65 and through processing layer 11.

Still consistent with embodiments of the present disclosure, ingest layer 7 may provide field of play location real-time indicator 60, over a standard application program interface 61. Real-time indicator 60 shows which video and camera sources are transitioning from in play to out of play or vice-versa.

An Audio/Video (AV) Processing module 71 may receive the rules. The AV processing module 71 may analyze the rules to determine various processing elements. For example, based on the rules, the AV processing module 71 may determine various content storage retrieval properties such as, but not limited to, for example, time, type, location, and the like. In this way, various content streams 72 may be selected over a standard program interface 70.

AV processing module 71 may work in conjunction with the rules. Some rules may be provided by an operator through the web-based client 63 interface, while other rules may be based on information received from the field of play location real-time indicator 60, as represent by label 60. This real-time indicator 60 may show which video and camera sources are transitioning from in play to out of play or vice-versa.

This input from the ingest layer may be used to start and stop processing of certain feeds from the detection devices. For example, if a player moves off a playing field, then, as there is no point in processing the player's corresponding feeds, processing layer 11 may be enabled to end processing for the corresponding feeds. In some embodiments, the ingest layer may also terminate the storage of the off-field player's feeds. Similarly, as an off-field player steps onto the field, then the player's corresponding feed processing may be reinstated.

Consistent with embodiments of the disclosure, these rules may further define processing of image stabilization 74; 3D and panoramic image stitching of multiple video sources 75; 360 degree views from a single player's perspective 76; digital signage with still images, video overlays, voice and music overlays, etc. 77.

Platform 100 may be expanded to accommodate various plug-and-play video and audio processes 78. In turn, rules engine 66 may be updated accordingly as these new processing methods are made available. In various embodiments, the combination of processing methods to apply 73 may be configurable through rules engine 66.

Still consistent with embodiments of the disclosure, processing layer 11 may retrieve feeds through the audio, video and data retrieval module 67. The feeds may be retrieved from storage 0, over a standard RAID or SAN retrieval methods 68.

It should be noted that processing layer 11 may be associated with the same storage employed by the ingest layer's 7 storage component 47. In other embodiments, processing layer 11 may receive raw data from the Ingest layer's 7 storage component 47 and, once the processing component has processed the raw data, it may store the processed data in its own corresponding storage component for subsequent streaming. In various other embodiments, processing layer 11 and ingest layer 7 may share the same storage component 9.

After completion of processing, AV processing module 72 may output multiple files 79, which may kept in storage 9. The memory location of these files may be made available to the rules engine, which then makes the file listing and metadata available to the streaming layer 13. In accordance to various embodiments of the present disclosure, communication between processing layer 11 and streaming layer 13 may occur over a standard IP interface.

VII. Streaming Layer

Figure 7:
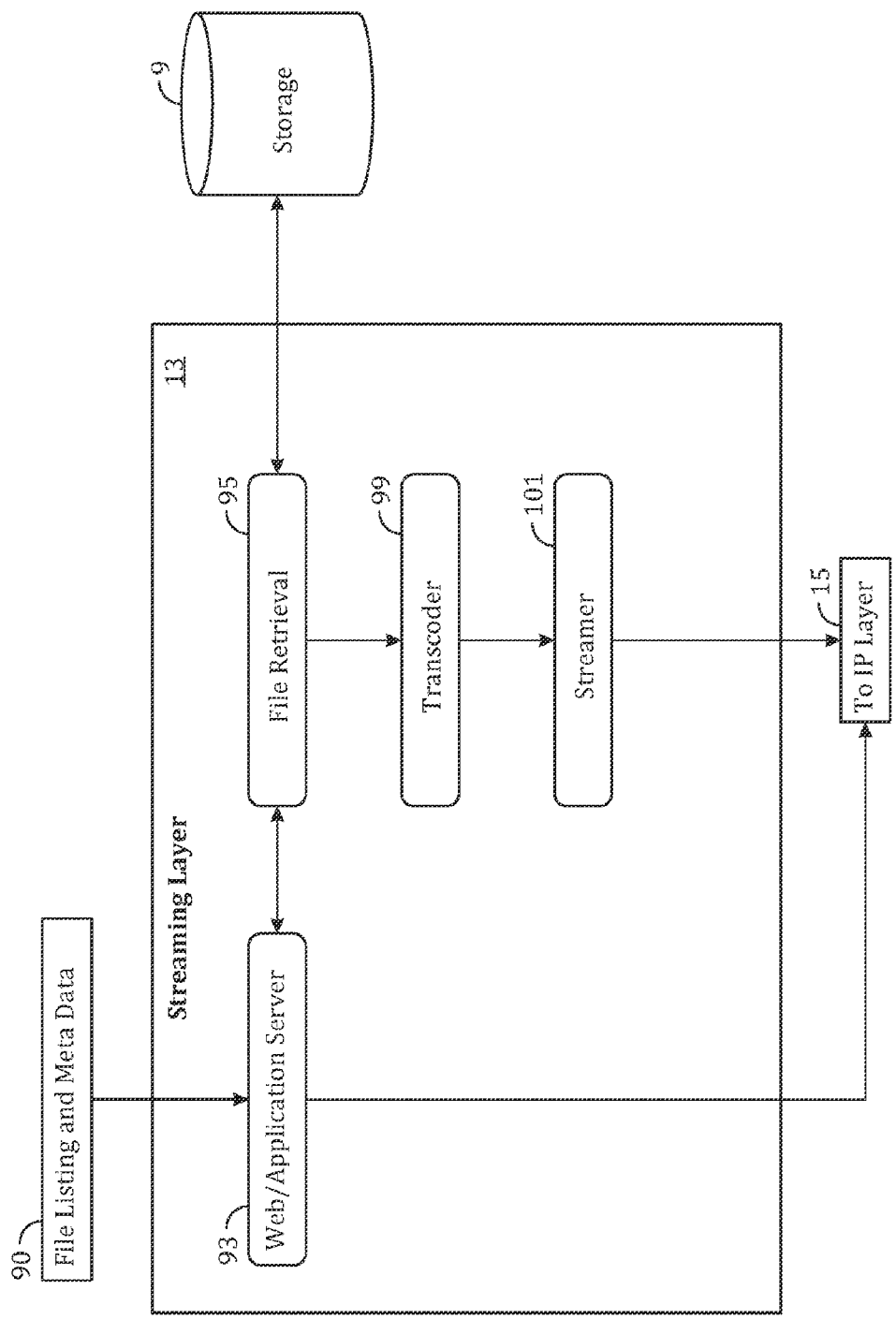
FIG. 7 illustrates an embodiment of a Streaming layer of the POV platform.

FIG. 7 illustrates an embodiment of a streaming layer 13 of platform 100. The streaming layer may stream, for example, audio and video content. Streaming layer 13 may receive a file listing and associated metadata 90 from processing layer 11. Consistent with the various embodiments of the present disclosure, processing layer 11 and streaming layer 13 may communicate via, for example, but not limited to, standard IP communications protocols.

A web or application server 93 may process this file listing. Based on the file listing, server 93 may form a program catalog available over web pages or a mobile device application user-interface (e.g., for android, windows mobile, or apple type clients). This content is ultimately rendered to end users 130 of platform 100 (via computing device 900), who may be present at the venue or watching the event hosted by the venue from a remote location.

The rendered user-interface may provide users 130 with selectable links or uniform resources locators (URLs) to the available point of views generated by processing layer 11 and their associated video and audio streams. Consistent with the various embodiments of the present disclosure, the rendered user-interface may provide content over standard IP communications. The web pages or application interface may be first made available to the IP layer 15. Having the application interface available in the IP layer 15, CDN's (e.g., networks 115a-115c) may be enabled to access the interface.

In response to a user-selection, the web server 93 may initiate a communication with a content retrieval module 95 over a standard program interface. Each stream, whether comprising raw or processed content, may be associated with an identifier. Furthermore, each stream may be associated with a multicast address, which may be used by the RTP streaming protocol to communicate the content. The content retrieval module 95 may be configured to pull content from storage 9 to stream to a device 900 associated with end-user 130. The content may retrieved using, for example, a standard SAN or RAID interface.

In response to a communication from web server 93, file retrieval module 95 may then send the requested files for transcoding to a transcoder 99 over a standard program interface. In various embodiments, the transcoding may be a variable bit rate process or other suitable means for streaming the requested content. The transcoded file may then be transmitted over a standard program interface to Video and Audio streamers 101. Audio and video streamers 101 may be configured to transmit content over a standard IP based stream using RTP protocol. These streams, in turn, may be delivered to a multicast router in the IP layer 15.

VIII. IP Layer

Figure 8:
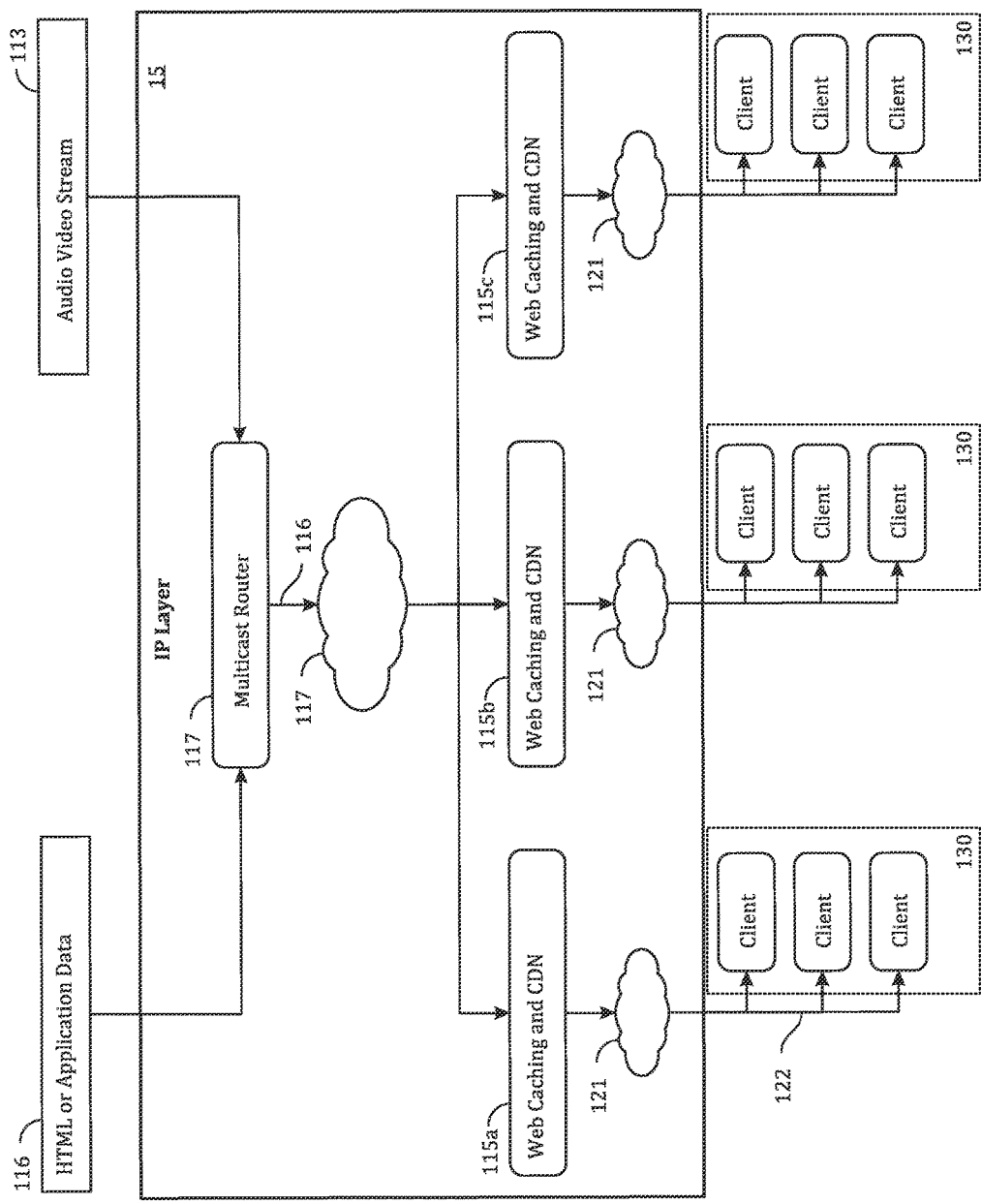
FIG. 8 illustrates an embodiment of an IP layer of the POV platform.

FIG. 8 represents an embodiment of an IP layer 15 of platform 100. Consistent with embodiments of the present disclosure, web pages or application data 116 from the streaming layer 13 may be first rendered to a multicast router 117 within IP layer 15. The web pages may be composed in an HTML format and the application data 116 may be programmed in a remote procedural call. The web pages and the application data 116 may be communicated over a standard IP interface.

As mentioned above, the web pages may comprise embedded links to the audio and video streams 113. Streams 113 may be transmitted to a multicast router over a standard RTP IP feed. The multicast router may convert the embedded links of the audio and video streams 113 to multicast corresponding IP addresses. The web pages may then be made available over, for example, the Intranet or Internet 117. In various embodiments, a firewall based IP interface 116 may be employed.

In view of licensing constrictions, the web pages, application data, and AV streams may be cached and replicated in multiple geographic areas (e.g., networks 115a-115c). Any private or commercial data networks, such as Amazon, Akamai, and the like, may operate these sites. The operation of the sites may depend on various licensing agreements associated with the platform. The locally cached content may then be streamed out over the Internet 121, over standard IP protocols.

The end-user 130 client(s) may connect to the local cached content over standard IP interfaces 122. End-user 130 clients may provide an interface for end-users to consume the content provided by the platform. The type of client, whether web-based or application-based, serves interface an end-user with the content. As mentioned above, the client may be operable on a plurality of devices, including, but not limited to, desktop and mobile computing devices. In some embodiments, the end-user clients may also be embedded in existing applications, e.g. NFL applications and web pages with existing authentication methods.

As also mentioned above, the end-user clients may provide an interface for presenting a plurality of, for example, points of view for user selection. The available points of view may be defined by, for example, a rules engine associated with the Processing layer. Thus, when a web-based or application-based client connects with, for example, a CDN (passing a first level of authentication), then the RTP multicast streams may be rendered to the client based on the end-user 130's selections of the point of view through the client (i.e., computing device 900).

IX. Computer Generated Imagery

Consistent with embodiments of the present invention, the platform may be operative to process the data captured from the various detection devices and render various computer generated imagery (CGI). In some embodiments, CGI may be used to provide an omniscient representation of the event hosted by the venue.

By way of non-limiting example, when the event is a Football game, the CGI may render a "chalkboard" representation of the game. As described above, each player of the football game may comprise detection and tracking devices. In turn, the CGI may represent each player as, for example, an X or an O, depending on whether the player is a defensive or offensive player. Embodiments of the platform may enable an operator to indicate which team has possession of the ball in order to determine the "offensive" or "defensive" status of each player. Similarly, the platform may enable the operator to manually provide a plurality of other properties associated with the event. In other embodiments, however, the combination of detection and tracking devices positioned throughout the venue, may reduce the amount of manual inputs that may be required from the operator.

The chalkboard representation, which may be based, at least in part, on the field indicator provided in the Ingest layer, may not only comprise static representations, but also dynamic representations of the action of the football game. For example, the chalkboard representation may simulate the movement of each player over a period of time. In this way, a coach, for example, may use the chalkboard representation to analyze the plays performed by both defensive and offensive players.

The CGI may enable a user to control the time and rate of playback. The CGI may further enable a user to select a player being represented by an X or an O and display a plurality of information associated with the selected player (or selected players). The information may comprise, for example, but not be limited to, the various points of view (stitched/raw), control in the hemispheric rotation of the views, statistics associated with the player (e.g., heart rate, blood pressure, oxygen levels, performance, field-time, bench-time, ball possession time, and the like). All of the information may be captured and aggregated by the detection and capturing devices 105 within the venue and those associated with the players.

Accordingly, the CGI may be in operative communication with both ingest layer 7 and processing layer 13 to provide this information. Such information can be displayed simultaneously or separately with the chalkboard representation by the CGI. Moreover, the CGI may be associated with various pattern detection algorithms. These algorithms may be enabled to provide information associated with players, teams, and games in an automated fashion.

Still consistent with embodiments of the present invention, the CGI may not be limited to a chalkboard representation. For example, and as mentioned above, in various embodiments, capturing devices 105 may be integrated into a portion of a player's equipment and comprise gyroscopic movement detection devices may be attached to a player's appendices. The data captured by the gyroscopic movement detection device may be translated into, for example, a virtual simulation of the player. When combined with the other detection devices associated with the player's equipment, a substantial virtual reality simulation may be provided to the user. This simulated environment may comprise all the similar functionalities and information provided by the chalkboard representation.

In some embodiments, it may be desired that the chalkboard representation only provide the representations associated with a single team. In this way, platform 100 may not enable the analysis of an opponent's plays or point of views or information associated therewith.

X. Computing Device

The present disclosure has referenced various computing devices, servers, and software applications associated with such devices. The computing devices may comprise, but not be limited to, a desktop computer, laptop, a tablet, or mobile telecommunications device. In each of these references, embodiments of the present disclosure may comprise a system having a memory storage and a processing unit. The processing unit coupled to the memory storage, wherein the processing unit is configured to perform the various functions disclosed for the referenced computing device.

Figure 9:
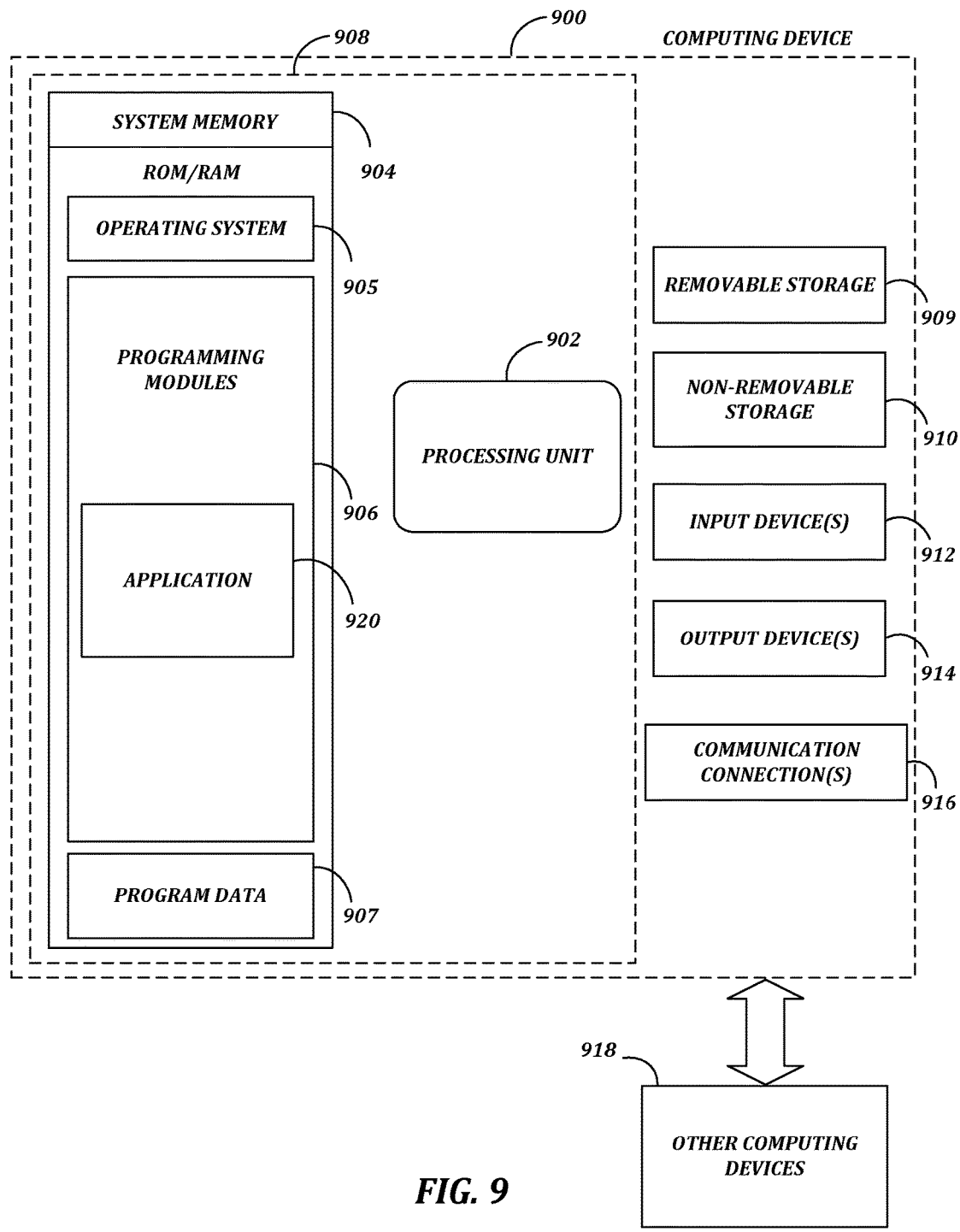
FIG. 9 is a block diagram of a system including a computing device.

FIG. 9 is a block diagram of a system including computing device 900. Consistent with an embodiment of the disclosure, the aforementioned memory storage and processing unit may be implemented in a computing device, such as computing device 900 of FIG. 9. Any suitable combination of hardware, software, or firmware may be used to implement the memory storage and processing unit. For example, the memory storage and processing unit may be implemented with computing device 900 or any of other computing devices 918, in combination with computing device 900. The aforementioned system, device, and processors are examples and other systems, devices, and processors may comprise the aforementioned memory storage and processing unit, consistent with embodiments of the disclosure.

With reference to FIG. 9, a system consistent with an embodiment of the disclosure may include a computing device, such as computing device 900. In a basic configuration, computing device 900 may include at least one processing unit 902 and a system memory 904. Depending on the configuration and type of computing device, system memory 904 may comprise, but is not limited to, volatile (e.g. random access memory (RAM)), non-volatile (e.g. read-only memory (ROM)), flash memory, or any combination. System memory 904 may include operating system 905, one or more programming modules 906, and may include a program data 907. Operating system 905, for example, may be suitable for controlling computing device 900's operation. In one embodiment, programming modules 906 may include application 920 (user interfaces for content operators and end users of platform 100). Furthermore, embodiments of the disclosure may be practiced in conjunction with a graphics library, other operating systems, or any other application program and is not limited to any particular application or system. This basic configuration is illustrated in FIG. 9 by those components within a dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by a removable storage 909 and a non-removable storage 910. Computer storage media may include volatile and nonvolatile, removable and non-removable media implemented in any method or technology for storage of information, such as computer readable instructions, data structures, program modules, or other data. System memory 904, removable storage 909, and non-removable storage 910 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 900. Any such computer storage media may be part of device 900. Computing device 900 may also have input device(s) 912 such as a keyboard, a mouse, a pen, a sound input device, a touch input device, etc. Output device(s) 914 such as a display, speakers, a printer, etc. may also be included. The aforementioned devices are examples and others may be used.

Computing device 900 may also contain a communication connection 916 that may allow device 900 to communicate with other computing devices 918, such as over a network in a distributed computing environment, for example, an intranet or the Internet. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 904, including operating system 905. While executing on processing unit 902, programming modules 906 (e.g., application 920) may perform processes including, for example, one or more of processes and functions disclosed herein. The aforementioned process is an example, and processing unit 902 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

XI. Advantages

The present invention may present a plurality of benefits and advantages over the state of the art. The following list is not meant to be an exhaustive list of these benefits and advantages. Moreover, not every benefit and advantage may be present in every embodiment of the present invention. The present invention may provide the following benefits and advantages:

Enabling the viewing sporting events from a personal point of view leading to heightened engagement of audiences and improved game experience;

Providing an individual viewer a choice of seeing the game from the desired point of view, rather being limited to a single broadcast selection, through the provision of a menu of selectable point of views from different angles within the field of play;

Enabling the viewing of sporting events with the use of cameras from within the field of play vs. cameras outside or above field of play, thereby providing video and audio from a player perspective vs. viewing of a player from a traditional audience perspective;

An ability to provide dynamically aggregated views from multiple players to provide an enhanced view of the field of play, thereby increasing audience participation and field situational awareness;

An ability to provide location data to end clients, thereby increasing audience field situational awareness;

An ability to augment views with other data sources such as location, inertial movements, eye movements, etc., thereby giving audience members an improved personal experience of their favorite players;

An ability to create richness and variety of dynamic views in an algorithmic manner (e.g. POV of whichever player has the ball, POV of defensive player closest to ball, etc.);

Providing visibility into audience likes and dislikes of different views within the field of play to give improved feedback to the content providers; and An ability to enhance existing broadcast TV model with alternative views on second screen technologies such as iPads and smart phones, etc.

XII. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

We claim:

1. A system comprising:
an ingest layer;
a processing layer;
a rules engine; and
a streaming layer,
wherein the ingest layer is configured to:
receive data from a plurality of data capturing devices, the data received from the plurality of capturing devices comprising: audio data, video data, and telemetry data, and
communicate the data to the processing layer,
wherein the processing layer is configured to:
receive a set of rules from the rules engine,
process the received data based on a metadata and the rules,
and
generate content based on the processed data,
wherein the processing layer employing the rules and metadata for stitching content received from the plurality of capturing devices into a single content stream by at least one of the following: stitching content from different capturing devices into a single frame and sequentially sequencing frames captured by the different capturing devices,
wherein the streaming layer is configured to:
receive the content and generate a content stream, and communicate the content stream, and
wherein the rules engine and layers are embodied in hardware and software.

2. The system of claim 1, further comprising a distribution Internet Protocol (IP) layer configured to facilitate an interaction with at least one of the following: an end-user, a broadcaster, a producer, and content delivery network (CDN) operator.

3. The system of claim 2, wherein the distribution IP layer is further configured to receive a request for the content stream from at least one of the following: the end-user, the broadcaster, the producer, and the CDN operator.

4. The system of claim 3, wherein the streaming layer is further configured to communicate the content stream using multicast IP based on the request received from at least one end-user, audience, broadcaster/producer, and CDN operator.

5. The system of claim 1, wherein the rules engine is configured to provide the processing layer with the rules for processing the data received from the ingest layer.

6. The system of claim 5, wherein the rules engine is further configured to determine the rules based on a request received from a content operator.

7. The system of claim 1, further comprising a transmission IP Layer configured with at least one of the following:
at least one wireless access point; and
at least one switch.

8. The system of claim 7, wherein the transmission IP layer is configured at a venue.

9. The system of claim 8, wherein the transmission IP layer is further configured to interface with the plurality of capturing devices located within the venue.

10. The system of claim 9, wherein the transmission IP layer is configured to communicate the data captured by the plurality of capturing devices located within the venue to the ingest layer.

11. The system of claim 8, wherein the transmission IP layer is further configured to receive control data from a data-center comprising the ingest layer.

12. The system of claim 11, wherein the transmission IP layer is further configured to communicate the control data received from the data-center to the plurality of capturing devices located within the venue.

13. The system of claim 1, wherein the audio content and the video content are communicated to the ingest layer via a first transmission stream and wherein the telemetric content is communicated via a second transmission stream.

14. The system of claim 13, wherein the ingest layer is configured to:
receive the first transmission stream and the second transmission stream, and
process the first transmission stream and the second transmission stream to create a data stream.

15. The system of claim 14, wherein the ingest layer being configured to process the first transmission stream and the second transmission stream into the data stream comprises the ingest layer being configured to compile the telemetric content as metadata associated with the audio content and video content.

16. The system of claim 15, wherein the processing layer is configured to:
receive the data stream from the ingest layer, and
employ the metadata associated in the data stream to process the audio content and the video content.

17. The system of claim 16, wherein the processing layer being configured to employ the metadata to process the audio content and the video content comprises the processing layer being configured to process the data stream for a particular point of view.

18. The system of claim 1, wherein the processing layer being configured to process the data stream comprises the processing layer being configured to apply at least one of the following:
image stabilization techniques,
overlays,
image stitching, and
plug-in modules for processing the content.

19. A system comprising:
an ingest layer;
a processing layer;
a rules engine; and
a streaming layer,
wherein the ingest layer is configured to:
receive audio data, video data, and telemetric data associated with a plurality of capturing devices,
communicate the received data to the processing layer,
wherein the rules engine is configured to:
determine a plurality of views to be generated from the received data,
derive a set of rules for processing the received data to generate each of the plurality of views,
communicate the set of rules to the processing layer,
wherein the processing layer is configured to:
derive metadata from the received data,
apply the set of rules for processing the data to generate the plurality of views,
process the received data based on the metadata and the rules,
generate content associated with each of the plurality of views,
wherein the streaming layer is configured to:
receive an end-user selection of a particular view, and stream the content associated with the particular view, and wherein the rules engine and layers are embodied in hardware and software.

* * * * *